United States Patent [19]

Gavagan et al.

[11] Patent Number: 4,967,977
[45] Date of Patent: Nov. 6, 1990

[54] PUSH BUTTON ALR RETRACTOR

[75] Inventors: James Gavagan, Center Line; Michael Uhazie, Rochester Hill, both of Mich.

[73] Assignee: Irvin Industries, Inc., Auburn Hills, Mich.

[21] Appl. No.: 392,017

[22] Filed: Aug. 10, 1989

[51] Int. Cl.⁵ .............................................. B65H 72/40
[52] U.S. Cl. .................. 242/107.40 A; 242/107.40 D
[58] Field of Search ............... 242/107.4 R, 107.4 A, 242/107.4 B, 107.4 C, 107.4 D; 280/806; 297/478, 480

[56] References Cited

U.S. PATENT DOCUMENTS

| | | | |
|---|---|---|---|
| 4,402,473 | 9/1983 | Kubota et al. | 242/107.4 A |
| 4,427,164 | 1/1984 | Rumpf | 242/107.4 A X |
| 4,856,727 | 8/1989 | Schmidt et al. | 242/107.4 B |

Primary Examiner—John M. Jillions
Attorney, Agent, or Firm—Lloyd M. Forster

[57] ABSTRACT

A vehicle sensitive inertia safety belt retractor (VSI) equipped with push button actuated automatic locking device (ALR) preventing belt extraction when manually pressed with the belt extracted to a buckle engageable extent. Automatic restoration of VSI mode is effected in response to the increased diameter of belt webbing on the retractor spool upon retraction following buckle disengagement.

8 Claims, 2 Drawing Sheets

PUSH BUTTON ALR RETRACTOR

BACKGROUND OF THE INVENTION

Combination vehicle sensitive inertia (VSI) and automatic locking retractors (ALR), employed particularly in child restraint systems for automobiles, are known in the art wherein ALR mode is established in response to full extraction of the retractor webbing, subject to reestablishment of VSI mode in response to full retraction as disclosed in U.S. Pat. No. 4,552,319; also where ALR mode is established in response to full extraction and slight retraction of retractor webbing, and reestablishment of VSI mode in response to partial retraction to less than operative connection extension as disclosed in U.S. Pat. No. 4,566,649.

Each of such systems is subject to the possibility of unintentional and undesired establishment of ALR mode wherein ratcheting engagement of the latch bar during retraction positively prevents any extraction; e.g., where a large occupant, or normal size driver reaching for the glove compartment, may inadvertently extract the belt sufficiently to actuate the ALR mode. In such case, the inconvenient need to disconnect the buckle and permit full or near full retraction in order to reestablish VSI mode presents an undesirable limitation.

In addition, the retractor mechanisms employed in converting between VSI and ALR modes disclosed in such prior art patents are somewhat complex and expensive to manufacture relative to a manual lever push button or other device located on the retractor housing adjacent the reel latch However, prior manual systems have been subject to certain limitations such as lack of automatic restoration of VSI mode upon belt retraction following use in ALR mode.

BRIEF DESCRIPTION OF THE PRESENT INVENTION

A simple manual push button lever mechanism has been mounted on the retractor housing adjacent the reel latch which provides a finger for actuating the latch bar to ALR mode when a push button is depressed at any extracted use position of the webbing, thereby establishing the ALR mode without need for full or near full extraction. A simple dual function spring interacting between a slide and a push button pivotally mounted on a cylindrical fixed stem provides both tension and torque functions to establish and retain the ALR mode until web retraction beyond use position is sensed and thereupon restores the VSI mode and retains such mode subject to any subsequent actuation of the push button with the webbing in extracted condition as for child restraint. The push button lever is positioned at one side of the housing where conveniently accessible, as in rear seat shoulder height retractors.

DETAILED DESCRIPTION OF ILLUSTRATED EMBODIMENTS

Figure 1:
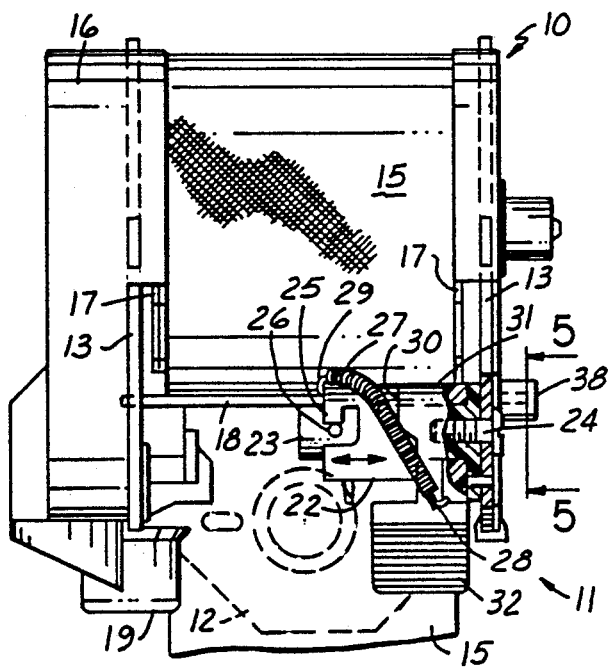
FIG. 1 is a front elevation of the retractor equipped with the push button ALR feature of the present invention shown in normal VSI mode.
Figure 2:
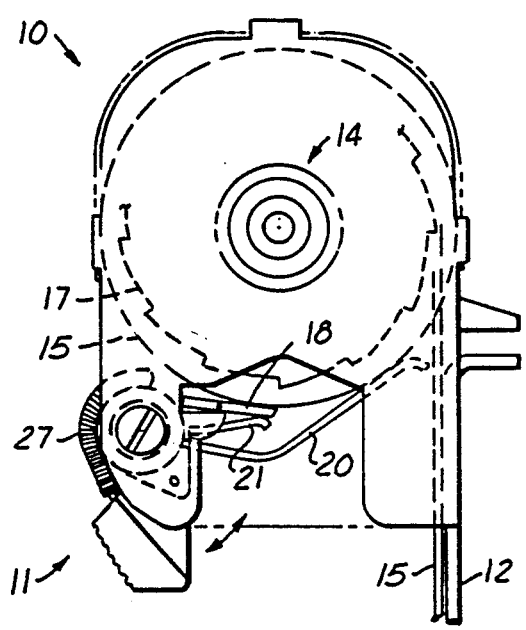
FIG. 2 is a side elevation of the retractor illustrated in FIG. 1.
Figure 3:
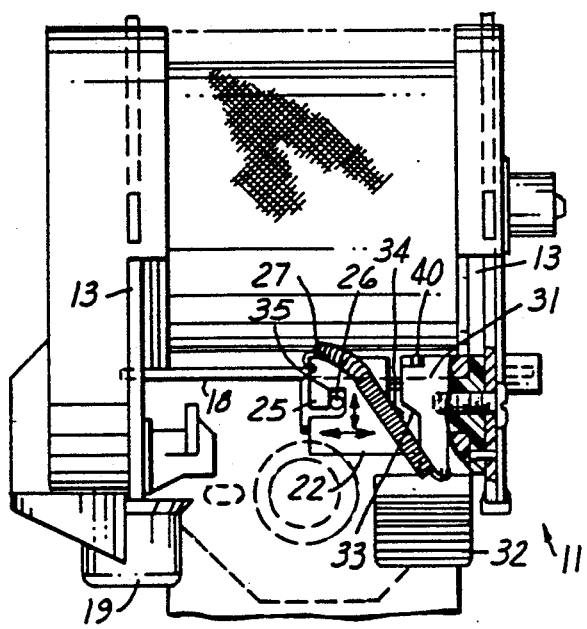
FIG. 3 is a front elevation of the retractor upon push button actuation to ALR mode.
Figure 4:
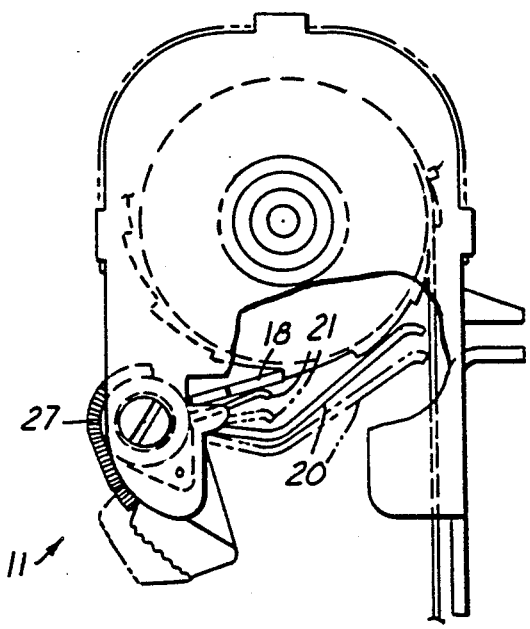
FIG. 4 is a side elevation of the retractor illustrated in FIG. 3.
Figure 5:
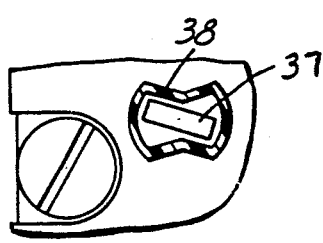
FIG. 5 is a fragmentary sectional view taken along the line 5—5 of FIG. 1.

With reference to FIGS. 1–4, conventional VSI retractor 10 is equipped with supplemental push button ALR control assembly 11. Retractor 10, having frame 12 mounted on a vehicle, includes side plates 13 mounting reel 14 for retractor belt webbing 15 wound to retracted condition, as shown in FIGS. 1 and 2, by a torque spring mounted within housing 16. Ratchet wheels 17 on either side of reel 14 are engageable by latch bar 18 pivotally mounted within side plates 13 for normal pendulum 19 actuated movement to engage ratchet teeth in response to sudden vehicle deceleration, locking the reel against webbing extraction, and for normal disengaged position to accommodate belt extraction in a clockwise direction of the reel as illustrated in FIGS. 2 and 4 against the force of the retraction spring within housing 16.

Supplemental to the normal VSI mode of operation under pendulum 19 control, push button ALR assembly 11 is provided with web sensing finger 20 and latch bar actuating finger 21 extending from slide 22 mounted on cylindrical stem 23 projecting from fixed attachment 24 at one of side plates 13. Slide 22 is normally retained in its inactive position, as shown in FIGS. 1 and 2, by projection 25 engaging pin 26 extending from stem 23 resisting torque of tension spring 27 anchored on push button lever arm 28 at one end and to slide connection 29 at the other end in a manner exerting torque on slide 22 in a downward direction on projection 25 as well as axial bias in a right-hand direction as shown in FIG. 1 limited by engagement of the adjacent surface 30 of annulus 31 pivoted in fixed axial position on stem 23 having lever 28 and push button extension 32.

In the inactive position shown in FIGS. 1 and 2, finger 21 projecting from slide 2 is biased to its nonactuating position relative to latch bar 18, as illustrated in FIG. 2, so that even when belt webbing is extracted for buckle connection, slide 22 and spring finger 21 remain inactive unless and until push button 32 is actuated.

Whenever belt webbing 15 has been extracted to any buckle connection extent and push button 32 is depressed, interengaging ramp surfaces, 33 on push button annulus 31 and 34 on slide 22, displace slide 22 to the left as shown in FIG. 3 disengaging projection 25 from pin 26 permitting torque bias of spring 27 to pivot slide 22 to the position shown in FIG. 3 as accommodated by slot 35 in which position finger 21 raises latch bar 18 to a ratchet engaging position, as shown in FIG. 4, where extraction of the belt webbing is prevented as required in ALR mode of operation while retraction of belt webbing to an effective restraining position is accommodated by ratcheting on the teeth of ratchet wheel 17.

When the ALR mode is initially established by actuation of push button 32, retention of such mode is effected by the side of projection 25 engaging pin 26 to prevent tension of spring 27 from returning slide 22 to the right, notwithstanding return of push button 32 annulus 31 and ramp surface 33 to a clearance position through tension of spring 27 exerting return torque on push button annulus 31. Upon buckle disconnection and return of belt webbing to its stored diameter, finger 20 is actuated by the webbing to pivot slide 22 to its FIG. 1 position where spring 27 can move slide 22 to the right restoring normal VSI mode automatically until such time as the push button may again be actuated deliberately with belt webbing extended to establish the ALR mode of operation.

Figure 6:
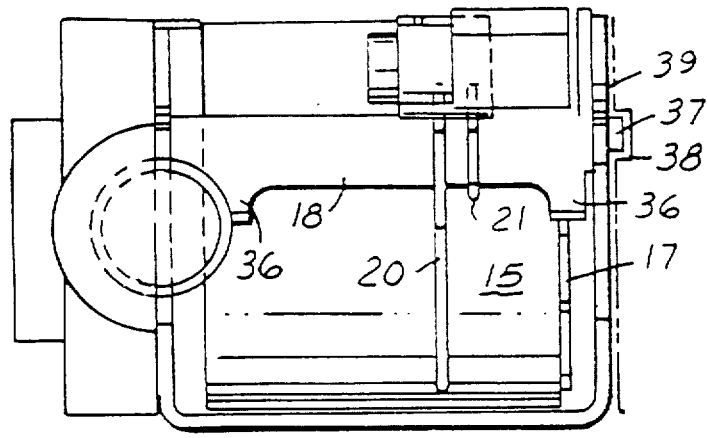
FIG. 6 is a bottom view of the retractor illustrated in FIG. 1.

With reference to the bottom view of FIG. 6, latch bar 18 is provided with extensions 36 for engaging ratchet teeth which also provide a redundant latch bar release by webbing 15 upon full retraction. Latch bar end extension 7 engages a molded pocket 38 in plastic cover 39 to limit pivotal extremities of latch bar 18 and suppress rattling noise from latch bar engagement with metal side walls 13.

Figure 7:
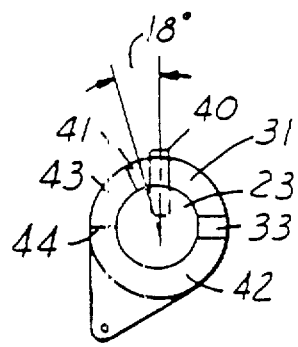
FIG. 7 is a side view of the push button and stem per se.
Figure 8:
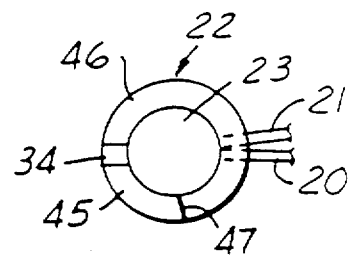
FIG. 8 is a side view of a slide per se actuated by the push button.

With reference to FIG. 7, push button annulus 31 has its pivotal travel on stem 23 limited, by pin 40 projecting from stem 23 engaging slot 41, to approximately 18°. Ramp surface 33 extends between lower surface 42 and higher surface 43, with right angle shoulder 44 therebetween, meeting slide 22 at its ramp surface 34 as illustrated in FIG. 8 extending between higher surface 45 and lower surface 46 with right angle shoulder 47 extending therebetween.

Figure 9:
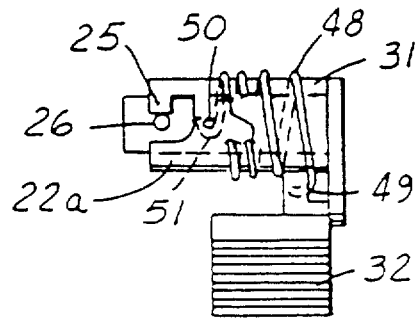
FIG. 9 is a fragmentary view of push button and modified slide mechanism per se, such as illustrated in FIG. 1, showing a preferred embodiment of combination torque and tension spring.

With reference to FIG. 9, a preferred dual action torque and extension spring 48 is anchored to push button lever at one end 49 and to pin 50 projecting from slide 22a at the other end 51 in order to effect tension coupling of adjacent surfaces between slide 22a and push button annulus 31 as well as torque biasing interengagement of projection 25 with pin 26. The action of this spring is preferred to that of spring 27 shown in FIGS. 1–4 due to absence of radial loading.

Figure 10:
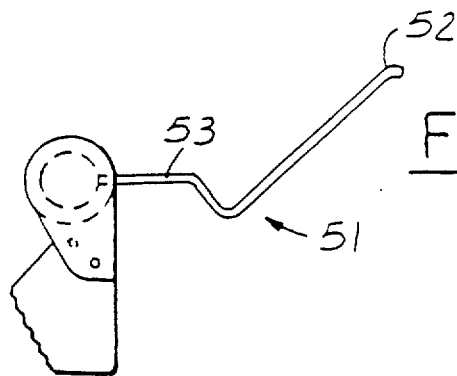
FIG. 10 is a side view of the FIG. 9 modification showing a single finger dual webbing sensor and latch bar actuator.

With reference to FIG. 10, single finger 51 serves the dual functions of fingers 20 and 21 with end 52 sensing webbing level and flat 53 engaging latch bar 18.

In summary, fixed stem 23 with projecting pins 26 and 40 provide pivotal mounting and reaction stop limits for slide 22 and push button annulus 31 which are biased, axially toward each other and rotationally to the extremities permitted by pins 26 and 40, by tension/torque spring 27 or 48; and with the effective mode of slide 22 established by slide projection 25 and slot 35. Normal axial abutment and rotational stop engagement of respective pins 26 and 40 is overcome by manual push button actuation causing ramp surfaces 33, 34 to displace slide 22 laterally to slot 35 alignment with pin 26 allowing torque spring rotational displacement of slide 22 to ALR mode with finger 21, 53 engagement of latch bar 18. Ratcheting of finger 21 during webbing retraction to restraint or belt storage position is accommodated by torque spring yielding while push button annulus 31 reacts against pin 40.

Optional construction of the slide, push button lever and stem elements of molded plastic will make possible the provision of fingers 20 and 21, FIGS. 2 and 4, or 51, FIG. 10, as integral plastic extensions from slide 21; also push button 32 and annulus 31 as a single piece; and stem stop elements 26 and 40, FIGS. 1, 3 and 7, as integral projections.

We claim:

1. A vehicle safety belt retractor having a vehicle sensitive inertia mode of operation and an automatic locking retractor mode of operation, said retractor including a retractor frame, a spool mounted for rotation on the frame for winding and unwinding the seat belt, a ratchet attached to the spool, a latch bar mounted for movement on said frame to engage the ratchet to lock the spool to prevent belt extension, vehicle sensitive inertia responsive means for moving the latch bar to its locking position, a pivotal push button lever means mounted to the retractor frame, means responsive to manual actuation of said push button means for moving the latch bar to its locking position for establishing an automatic locking retractor mode, and means responsive to belt webbing retraction beyond a predetermined amount for restoring the vehicle sensitive inertia mode, wherein said means responsive to manual actuation of said push button means includes a cylindrical stem mounted on said retractor frame, a slide axially and pivotally displaceable on said stem, means projecting from said slide responsive to axial and pivotal slide displacement, engageable with said latch bar to hold it in automatic locking retractor mode, and means actuated by operation of said push button lever means for displace said slide between vehicle sensitive inertia and automatic locking retractor mode positions.

2. Combination of claim 1 wherein said push button lever means is mounted on said stem with means fixing its axial position and constraining its pivotal displacement to a limited arc, and wherein said slide is mounted on said stem adjacent said push button lever means with means accommodating limited axial and pivotal displacement, resilient means biasing said slide axially toward said push button lever means and pivotally relative to said push button lever means in a direction causing automatic locking retractor actuation of said latch bar, and stop means on said stem engageable with a projection on said slide in a position preventing said latch bar engagement when said slide is displaced toward said push button lever means.

3. Combination of claim 2 wherein said means responsive to said belt webbing retraction is effective to pivot said slide to a latch bar disengaging position whereupon said resilient means is operative to displace said slide axially toward said push button lever means.

4. Combination of claim 3 wherein said means responsive to belt webbing retraction comprises an element projecting from said slide actuated by said webbing upon retraction beyond said predetermined amount.

5. Combination of claim 3 wherein said means responsive to belt webbing retraction comprises latch bar projections engageable by said webbing upon retraction beyond said predetermined amount.

6. Combination of claim 2 wherein said resilient means comprises spring means interconnected to said slide and push button lever means establishing an axial bias toward each other and a relative rotational bias in one direction, and said means for displacing comprises interengaging cam means responsive to manual push button lever means actuation for producing relative axial separation, and means responsive to said separation for accommodating relative pivotal displacement of said slide to establish automatic locking retractor mode.

7. Combination of claim 6 wherein said resilient means comprises an extension spring having ends respectively coupled to said push button lever means and said slide at axially and circumferentially spaced positions so as to produce both axial and circumferential bias toward each other.

8. Combination of claim 6 wherein said resilient means comprises a helical torsion/extension spring extending around said respective push button lever means and slide having an axis coincident with said stem.

* * * * *

UNITED STATES PATENT AND TRADEMARK OFFICE
CERTIFICATE OF CORRECTION

PATENT NO. : 4,967,977

DATED : November 6, 1990

INVENTOR(S) : James Gavagan, et al.

It is certified that error appears in the above-identified patent and that said Letters Patent is hereby corrected as shown below:

Title page:

The sheet of drawing consisting of Figs. 6-10 should be added as shown on the attached sheet.

Column 2, line 53, "2" should be --22--;

Column 3, line 22, "7" should be --37--.

Signed and Sealed this

Fourth Day of August, 1992

Attest:

DOUGLAS B. COMER

Attesting Officer

Acting Commissioner of Patents and Trademarks